(12) United States Patent
Nagy et al.

(10) Patent No.: US 7,049,262 B2
(45) Date of Patent: May 23, 2006

(54) CRYOGENIC METHOD FOR FORMING A SUPPORTED CATALYST

(75) Inventors: Sandor Nagy, Naperville, IL (US); Kenneth W. Johnson, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 118 days.

(21) Appl. No.: 10/689,439

(22) Filed: Oct. 20, 2003

(65) Prior Publication Data

US 2005/0085376 A1    Apr. 21, 2005

(51) Int. Cl.
*B01J 31/00*    (2006.01)
*B01J 37/00*    (2006.01)
*C08F 4/02*    (2006.01)
*C08F 4/60*    (2006.01)

(52) U.S. Cl. .................. 502/104; 502/107; 502/151; 502/152; 502/155; 502/159

(58) Field of Classification Search ................ 502/104, 502/107, 151, 152, 155, 159
See application file for complete search history.

(56) References Cited

U.S. PATENT DOCUMENTS

| | | | | |
|---|---|---|---|---|
| 3,857,795 A | * | 12/1974 | Van Der Bend et al. | ... 502/107 |
| 5,855,965 A | * | 1/1999 | Molerus et al. | ............. 427/475 |
| 6,110,397 A | * | 8/2000 | Shepodd et al. | ......... 252/181.6 |
| 6,893,995 B1 | * | 5/2005 | Thomas et al. | ............. 502/152 |
| 6,958,308 B1 | * | 10/2005 | Brown | ....................... 502/180 |
| 2005/0209095 A1 | * | 9/2005 | Brown | ....................... 502/150 |

* cited by examiner

Primary Examiner—J. A. Lorengo
Assistant Examiner—J. Pasterczyk
(74) Attorney, Agent, or Firm—Brooks Kushman P.C.

(57) ABSTRACT

The present invention provides a method of preparing a supported catalyst from a liquid catalyst system dispersed on a solid carrier. The method of this embodiment comprises freezing the liquid catalyst system in a non-reactive liquid to form a frozen catalyst system dispersed within the non-reactive liquid. The frozen catalyst system is then contacted with a solid carrier. Finally, the non-reactive liquid is removed to yield the supported catalyst. In another embodiment, a supported catalyst made by the methods of the present invention is provided.

22 Claims, No Drawings

CRYOGENIC METHOD FOR FORMING A SUPPORTED CATALYST

BACKGROUND OF THE INVENTION

1. Field of the Invention

In at least one aspect, the present invention relates to a method of using a liquid catalyst system to prepare a supported catalyst with the liquid catalyst dispersed onto a solid carrier.

2. Background Art

The chemical industry uses a wide variety of transition metal complexes as catalysts for organic reactions. Olefin polymerization is an important example of such a reaction. A number of different catalyst systems are used in the polymer and plastics industries. Such catalysts systems include, for example, single-site (metallocene and non-metallocene) catalysts and Ziegler-Natta catalysts. Historically, polyolefins have been made with Ziegler catalyst systems that include transition metal-containing compounds and one or more organometallic compounds. For example, titanium trichloride and diethylaluminum chloride have been used to form polyethylene. Similarly, a catalyst system containing titanium tetrachloride, vanadium oxytrichloride, and triethylaluminum is also effective for making polyethylene. The single site catalysts are generally more desirable since they are more reactive and produce polymers with improved physical properties. Single site catalysts tend to form polymers with a narrower molecular weight distribution, a lower concentration of low molecular weight components, more uniform comonomer incorporation and lower density. Moreover, Ziegler-Natta catalysts tend to produce polymers having a broad molecular weight distribution which may be undesirable for such molding operations as injection molding.

Metallocene catalysts include one or more $\pi$-bonded ligands such as cyclopentadienyl groups or boraaryl groups. This type of ligand has been found to have significant effects on the active catalyst site. Late transition metal (groups 8–10) single-site catalysts are also known. Numerous other catalysts for various other polymerizations are also known. Such catalysts include, for example chromium based catalysts, vanadium based catalysts such as vanadium oxychloride and vanadium acetylacetonate, cationic forms of metal halides, such as aluminum trihalides and cobalt based catalysts.

Some polymerization processes such as gas phase and slurry polymerization generally require a support to control polymer particle size and to prevent fouling of the reactor walls. Suitable supports include, for example, inorganic oxides, inorganic chlorides, and polymeric resins such as polystyrene, styrene-divinylbenzene copolymers, and the like. Such carriers contain some polar groups to assist in attachment to the catalysts. The most widely used supports are inorganic oxides of the Group 2, 3, 4, 5, 13, or 14 elements. Catalysts are attached to these supports by a number of techniques. For example, the organometallic component of a catalyst may be dissolved in a solvent and contacted with the support. Subsequently, the solvent is removed by evaporation. In an alternative method, an activator is deposited on the support either separate from or together with an organometallic compound.

Treated or untreated supports can be used. However, it is preferred to pretreat the support by thermal (calcined) or chemical methods. For example, calcination is typically performed at a temperature greater than about 150° C. Chemical agents which may be used to pretreat a support include organoaluminums, organosilanes, organoboranes, organomagnesiums, organozinc compounds and the like. Preferred chemical agents include alumoxanes, hexamethyldisilazane, trimethylchlorosilane, Grignard reagents, and triethylboron. Although these methods of applying a support work reasonably well, there is a tendency even after support pre-treatment for clumping of the catalysts to occur. Such clumping interferes with the efficiency of the catalysts and accordingly is undesirable.

Accordingly, there exists a need for an improved method of contacting and dispersing a liquid catalyst onto a solid support or carrier.

SUMMARY OF THE INVENTION

The present invention overcomes the problems of the prior art by providing in one embodiment a method of preparing a supported catalyst from a liquid catalyst system dispersed on a solid carrier. The method of this embodiment comprises freezing the liquid catalyst system in a non-reactive liquid to form a frozen catalyst system which is then dispersed within the non-reactive liquid. Such dispersion may be accomplished by suitable mechanical methods such as mechanical stirring. The frozen catalyst system is then contacted with a solid carrier. Finally, the non-reactive liquid is removed to yield the supported catalyst. The methods of the invention are advantageously applied to any liquid catalyst that needs to be incorporated with a solid carrier. The most useful non-reactive liquid is liquid nitrogen.

In another embodiment of the present invention, a supported catalyst made by the methods of the invention is provided. The supported catalyst of the invention is superior to analogous supported catalysts made by the prior art techniques. For example, the supported catalyst of the present embodiment is dispersed more uniformly on the solid carrier support with less clumping of the catalyst. Accordingly, the supported catalyst of the invention has improved efficiency and stability when compared to a supported catalyst made by conventional methods from the same liquid catalyst and support solid.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

As used herein, "liquid catalyst" means a composition that includes one or more catalysts that are liquid themselves, dispersed in a liquid, or dissolved in a liquid. Such liquids may contain additional additives such a activators, catalyst additives, solvents, and the like.

In an embodiment of the present invention, a method of preparing a supported catalyst from a liquid catalyst system dispersed on a solid carrier is provided. The method of this embodiment comprises freezing the liquid catalyst system in a non-reactive liquid to form a frozen catalyst system dispersed within the non-reactive liquid. The frozen catalyst system is then contacted with a solid carrier. Finally, the non-reactive liquid is removed to yield the supported catalyst. The non-reactive liquid is preferably removed by controlling the evaporation by allowing the non-reactive liquid to slowly warm. In order to effect the freezing of the catalyst system, the non-reactive liquid has a boiling point that is lower than the melting point of the liquid catalyst system. Typically, the non-reactive liquid is a liquified gas. Examples of such liquified gases include, but are not limited to, liquified nitrogen gas, liquified helium gas, and low molecular weight saturated hydrocarbons (methane, ethane, propane, butane, or mixtures thereof.)

Any suitable solid carrier having sufficient porosity to incorporate a catalyst may be used in practicing the present invention. Suitable examples include inorganic oxides, inorganic silicates, inorganic chlorides, or organic polymer resins. Organic polymer resins include styrenic polymers, such as polystyrene and styrene-divinylbenzene copolymers; polyolefins, such as polyethylene and ethylene-alkyl acrylate copolymers; polybenzimidizoles and the like. The preferred solid carriers are inorganic oxides such as silica, alumina, silica-alumina, magnesia, titania and zirconia. The most preferred carrier is silica. The preferred inorganic oxides are further characterized with a surface area from 10 to 700 $m^2/g$, a pore volume from 0.1 to 4 ml/g, average particle size from 10 to 500 mm and pore diameter from 10 to 1000. Optionally, the inorganic oxide is pretreated to remove all or a portion of hydroxyl functionality present on the surface of the solid carrier. Such pretreatment is accomplished by thermal, chemical or a combination of thermal and chemical treatments. Moreover, a sufficient amount of solid carrier is provided so that the supported catalyst contains from about 0.001 to about 0.5 mmole transition metal per gram of solid carrier.

If inorganic solid carriers are utilized as the solid carrier, the carrier may be pretreated prior to being contacted with the liquid catalyst. Such pretreatment may remove or at least reduce the number of surface hydroxyl groups on the carrier. Such pretreatment may be accomplished by thermal treatment, chemical treatment, or a combination thereof. Multiple chemical or thermal treatments are also possible.

Thermal treatments may be carried out at temperatures of up to about 1000° C. More preferably, the thermal treatment will be at a temperature from about 50° C. to about 800° C. are most commonly used, particularly if the thermal treatment is to be used in conjunction with chemical treatment. Most preferably, the thermal treatment will be at a temperature from about 100° C. to about 600° C. Chemical treatment comprises contacting the solid carrier with a chemical agent capable of reacting with surface hydroxyl groups. Treatment with the chemical agent may be in either the liquid phase or in the vapor phase. Treatment temperatures are generally in the range of from about 20° C. to about 400° C.

Although any liquid catalyst may be dispersed onto a solid carrier by the method of the invention, the preferred liquid catalysts comprise an organometallic compound or a transition metal complex of a Group 3 to Group 10 element of the periodic table. Examples of such catalysts include a Ziegler-Natta catalyst, a chromium based catalyst, a vanadium based catalyst, a single site metallocene catalyst, and late transition metal based catalyst.

The liquid catalyst system used in the methods of the invention may optionally include one or more activators. Generally, the activators convert the metal complex present in many catalysts to a cationically active species. The catalysts are especially valuable for polymerizing olefins, such as ethylene, propylene, and/or other α-olefins such as 1-butene or 1-hexene. Suitable activators are well known in the art. Preferred activators include alumoxanes (e.g., methyl alumoxane (MAO), ethyl alumoxane, diisobutyl alumoxane); alkylaluminum compounds (e.g., triethylaluminum, trimethylaluminum); alkyl aluminum halides (e.g., diethylaluminum chloride ); alkyl aluminum hydrides; alkylsilyl halides; alkyldisilazanes; alkyl and aryl alkoxysilanes; alkyl, aryl, and alkoxy boron compounds, and mixture thereof. Such activators are generally used in an amount within the range of about 0.01 to about 100,000, preferably from about 1 to about 10,000 moles per mole of transition metal complex. Preferred activators also include acid salts that contain non-nucleophilic anions. These compounds generally consist of bulky ligands attached to boron or aluminum. Examples include lithium tetrakis(pentafluorophenyl) borate, lithium tetrakis(pentafluorophenyl) aluminate, anilinium tetrakis(pentafluorophenyl) borate, and the like. These activators are generally used in an amount within the range of about 0.01 to about 1000, preferably from about 1 to about 10 moles per mole of transition metal complex. Suitable activators also include trialkyl or triarylboron compounds such as tris(pentafluorophenyl)boron, tris(pentabromophenyl) boron, and the like. Other suitable activators are described, for example, in U.S. Pat. Nos. 5,756,611, 5,064, 802, and 5,599,761, the teachings of which are incorporated herein by reference.

In the most preferred embodiment of the invention, the non-reactive liquid is liquid nitrogen. The method of this embodiment comprises dispersing a liquid catalyst system in liquid nitrogen. The liquid nitrogen is cold enough to freeze the liquid catalyst. Next, a solid carrier is dispersed in the liquid nitrogen so that the frozen liquid catalyst contacts the solid carrier. Subsequently, the liquid nitrogen is removed to leave behind the supported catalyst. As set forth above, the step of removing the non-reactive liquid is performed by evaporation of the non-reactive liquid. Selection of the solid carrier, the liquid catalyst components, and activators are also the same as set forth above.

The following examples illustrate the various embodiments of the present invention. Those skilled in the art will recognize many variations that are within the spirit of the present invention and scope of the claims.

EXPERIMENTS

Experiments are carried out under inert atmosphere conditions, using Schlenk glassware and vacuum line. The reaction flask is a 250 ml round bottom flask with a Teflon paddle type stirrer. The catalyst complex used for these experiments is (5,8-dimethyl-5,10-dihydroindeno [1,2-b]indol-yl) (cyclopentadienyl) zirconium dichloride (LiCl) and is prepared by the method described in U.S. Pat. No. 6,559,251. The entire disclosure of this patent is hereby incorporated by reference. Methylaluminoxane is supplied by Albemarle Corp as 13.6% Al in toluene.

1. Experiment 1 (Control)

About 3 grams Sylopol™ 955 silica (commercially available form W. R. Grace\Davision located in Baltimore Md.), previously heated to 600° C. in nitrogen fluidized bed, are added to a flask and slurried with 100 ml dried toluene. In an inert atmosphere glove box, methylaluminoxane (4.2 g, 21 mmol Al) and the catalyst complex (52.7 mg, 0.105 mmol) are mixed together to form a solution. The solution is added dropwise to a silica slurry. After mixing for 1 hour, the reaction flask is placed in a 40° C. oil bath with continuing stirring. The toluene is removed under vacuum to yield free flowing granular solids. SEM micrographs of the resulting supported catalyst show agglomerated catalyst particles that are rich in aluminum. The extent of agglomeration was quantified to be about 10% by catalyst sieve analysis.

2. Experiment 2 (−131° C.)

About 3 grams Sylopol™ 955 silica, previously heated to 600° C. in nitrogen fluidized bed, are added to a reaction flask. The reaction flask is placed in a pentane liquid nitrogen bath. A silica slurry is formed by adding approximately 100 ml isobutane and stirring. In an inert atmosphere glove box, methylaluminoxane (4.2 g, 21 mmol Al) and the catalyst complex (52.7 mg, 0.105 mmol) are mixed together to form a solution. The solution is added dropwise to the silica slurry. After mixing for 1 hour, the reaction flask is removed from the bath and the isobutane allowed to vaporize. The reaction flask is then placed in a 40° C. oil bath while continuing to stir and toluene is removed under vacuum. The supported catalyst formed in this experiment is expected to be uniformly deposited on the support with reduced formation of agglomerated catalyst particles.

3. Experiment 3 (−195° C.)

About 3 grams of Sylopol™ 955 silica, previously heated to 600° C. in a nitrogen fluidized bed are added to a reaction flask. The reaction flask is placed in a liquid nitrogen bath. A silica slurry is formed by adding approximately 100 ml liquefied nitrogen and stirring. In an inert atmosphere glove box, methylaluminoxane (4.2 g, 21 mmol Al) and the catalyst complex (52.7 mg, 0.105 mmol) are mixed together to form a solution. The solution is added dropwise to the silica slurry. After mixing for 1 hour, the reaction flask is removed from the bath and the liquefied nitrogen allowed to vaporize. The reaction flask is then placed in a 40° C. oil bath while continuing to stir and the toluene is removed under vacuum. The supported catalyst formed in this experiment is expected to be uniformly deposited on the support with reduced formation of agglomerated catalyst particles.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of preparing a supported catalyst from a liquid catalyst, the method comprising:
    dispersing the liquid catalyst in a non-reactive liquid, the non-reactive liquid being at a sufficiently low temperature to freeze the liquid catalyst to form a frozen catalyst;
    dispersing a solid carrier in the non-reactive liquid wherein the frozen catalyst contacts the solid carrier; and
    removing the non-reactive liquid by evaporation.

2. The method of claim 1 wherein the non-reactive liquid is liquified nitrogen gas, liquified argon gas, or liquified helium gas.

3. A supported catalyst made by the method comprising:
    dispersing a liquid catalyst in a non-reactive liquid, the non-reacting liquid being at a sufficiently low temperature to freeze the liquid catalyst and form a frozen catalyst;
    dispersing a solid carrier in the non-reactive liquid wherein the frozen catalyst contacts the solid carrier; and
    removing the non-reactive liquid by evaporation.

4. The method of claim 1 wherein the solid carrier is an inorganic oxide, inorganic silicate, inorganic chloride or organic polymer resin.

5. The method of claim 4 wherein the solid carrier is an inorganic oxide selected from the group consisting of silica, alumina, silica-alumina, magnesia, titania and zirconia.

6. The method of claim 4 wherein the solid carrier is silica.

7. The method of claim 4 wherein the inorganic oxide has a surface area from 10 to 700 m2/g, a pore volume from 0.1 to 4 ml/g, average particle size from 10 to 500 mm, and a pore diameter from 10 to 1000.

8. The method of claim 4 wherein the inorganic oxide is pre-treated to remove all or a portion of hydroxyl functional groups present on the surface of the solid carrier.

9. The method of claim 8 wherein the pretreatment is accomplished by thermal treatment, chemical treatment, or a combination thereof.

10. The method of claim 1 wherein the supported catalyst contains from 0.001 to 0.5 mmole transition metal per gram of solid carrier.

11. The method of claim 1 wherein the liquid catalyst comprises a group 3 to group 10 transition metal complex or an organometallic compound.

12. The method of claim 1 wherein the liquid catalyst comprises a component selected from the group consisting of a Ziegler-Natta catalyst, a catalyst comprising chromium, a catalyst comprising vanadium, a single site metallocene catalyst, a cationic metal halide catalyst, a catalyst comprising cobalt, and a catalyst comprising nickel.

13. The method of claim 12 wherein the liquid catalyst further comprises an activator.

14. The method of claim 13 wherein the activator is selected from the group consisting of alumoxanes; alkylaluminum compounds; alkyl aluminum halides; alkyl aluminum hydrides; alkylsilyl halides; alkyldisilazanes; alkyl and aryl alkoxysilanes; alkyl, aryl, and alkoxy boron compounds; and mixture thereof.

15. A method of preparing a supported catalyst from a liquid catalyst, the method comprising:
    dispersing the liquid catalyst in liquid nitrogen, the liquid nitrogen being at a sufficiently low temperature to freeze the liquid catalyst and form a frozen catalyst;
    dispersing a solid carrier in the liquid nitrogen wherein the frozen catalyst contacts the solid carrier; and
    removing the liquid nitrogen by evaporation.

16. The supported catalyst of claim 3 wherein the non-reactive liquid is liquified nitrogen gas, liquified argon gas, or liquified helium gas.

17. The method of claim 15 wherein the solid carrier is an inorganic oxide, inorganic silicate, inorganic chloride or organic polymer resin.

18. The method of claim 17 wherein the solid carrier is an inorganic oxide selected from the group consisting of silica, alumina, silica-alumina, magnesia, titania and zirconia.

19. The method of claim 15 wherein the liquid catalyst comprises a complex of a group 3 to group 10 element of the Periodic Table or an organometallic compound.

20. The method of claim 15 wherein the liquid catalyst comprises a component selected from the group consisting of a Ziegler-Natta catalyst, a catalyst comprising chromium, a catalyst comprising vanadium, a single site metallocene catalyst, a cationic metal halide catalyst, a catalyst comprising cobalt, and a catalyst comprising nickel.

21. The method of claim 20 wherein the liquid catalyst further comprises an activator.

22. The method of claim 21 wherein the activator is selected from the group consisting of alumoxanes; alkylaluminum compounds; alkyl aluminum halides; alkyl aluminum hydrides; alkylsilyl halides; alkyldisilazanes; alkyl and aryl alkoxysilanes; alkyl, aryl, and alkoxy boron compounds, and mixture thereof.

* * * * *